US009128619B2

(12) United States Patent
Sims et al.

(10) Patent No.: US 9,128,619 B2
(45) Date of Patent: Sep. 8, 2015

(54) SYSTEM, METHOD AND COMPUTER PROGRAM PRODUCT FOR OPTIMIZATION OF TAPE PERFORMANCE

(71) Applicant: KIP CR P1 LP, New York, NY (US)

(72) Inventors: Robert C. Sims, Round Rock, TX (US); William H. Moody, II, Austin, TX (US); Brian J. Bianchi, Cedar Park, TX (US)

(73) Assignee: KIP CR P1 LP, New York, NY (US)

( * ) Notice: Subject to any disclaimer, the term of this patent is extended or adjusted under 35 U.S.C. 154(b) by 0 days.

(21) Appl. No.: 14/671,849

(22) Filed: Mar. 27, 2015

(65) Prior Publication Data

US 2015/0205529 A1    Jul. 23, 2015

Related U.S. Application Data

(63) Continuation of application No. 14/448,647, filed on Jul. 31, 2014, now Pat. No. 9,013,823, which is a continuation of application No. 13/267,758, filed on Oct. 6, 2011, now Pat. No. 8,817,411.

(51) Int. Cl.
*G06F 3/06* (2006.01)

(52) U.S. Cl.
CPC ............... *G06F 3/061* (2013.01); *G06F 3/065* (2013.01); *G06F 3/0647* (2013.01); *G06F 3/0682* (2013.01)

(58) Field of Classification Search
None
See application file for complete search history.

(56) References Cited

U.S. PATENT DOCUMENTS

| | | |
|---|---|---|
| 5,883,864 A | 3/1999 | Saliba |
| 6,725,394 B1 | 4/2004 | Bolt |
| 6,842,841 B1 | 1/2005 | Kuik et al. |
| 8,566,517 B1 | 10/2013 | Sims et al. |
| 8,817,411 B2 | 8/2014 | Sims et al. |
| 8,856,437 B2 | 10/2014 | Sims et al. |
| 9,013,823 B2 | 4/2015 | Sims et al. |
| 2004/0202073 A1 | 10/2004 | Lai et al. |
| 2009/0077310 A1 | 3/2009 | Ashton et al. |
| 2010/0049916 A1 | 2/2010 | Nakajima et al. |
| 2014/0344516 A1 | 11/2014 | Sims et al. |

OTHER PUBLICATIONS

Pease, David, et al., "The Linear Tape File System," IBM Yamato Lab, 2010, 8 pgs., #978-1-4244-7153-9/10, IEEE, US.
Linear Tape File System (LTFS) Format Specification, LTFS Format Version 2.0.0., Mar. 11, 2011, 69 pgs, accessed on Sep. 29, 2011 from http://www.trustlto.com/LTFS_Format_To%20Print.pdf.

(Continued)

*Primary Examiner* — Paul Huber
(74) *Attorney, Agent, or Firm* — Sprinkle IP Law Group

(57) ABSTRACT

A tape performance optimization method may include accumulating data in a memory, monitoring the accumulation of data, determining whether a certain amount of data has been accumulated in the memory, and causing the accumulated data to be migrated to a tape in a tape library. In one embodiment, the amount of data to be accumulated is set to be two wraps or a multiple thereof. Using embodiments, it can take zero or near zero time to rewind the tape when unloading occurs, eliminating wasted tape movement time and significantly increasing tape performance. In one embodiment, the accumulation of data may be terminated even if the desired amount of data has not been accumulated. In one embodiment, the termination might be triggered by a timeout condition.

20 Claims, 8 Drawing Sheets

(56) References Cited

OTHER PUBLICATIONS

Office Action for U.S. Appl. No. 13/267,758, mailed Aug. 22, 2013, 3 pgs.
Office Action for U.S. Appl. No. 13/267,758, mailed Feb. 28, 2014, 5 pgs.
Office Action for U.S. Appl. No. 14/031,924, mailed Jun. 2, 2014, 5 pgs.
Office Action for U.S. Appl. No. 14/448,647, mailed Sep. 15, 2014, 4 pgs.
Notice of Allowance for U.S. Appl. No. 14/448,647, mailed Dec. 24, 2014, 4 pgs.

SYSTEM, METHOD AND COMPUTER PROGRAM PRODUCT FOR OPTIMIZATION OF TAPE PERFORMANCE

CROSS-REFERENCE TO RELATED APPLICATION

This application is a continuation of, and claims a benefit of priority under 35 U.S.C. 120 from U.S. patent application Ser. No. 14/448,647, filed Jul. 31, 2014, entitled "SYSTEM, METHOD AND COMPUTER PROGRAM PRODUCT FOR OPTIMIZATION OF TAPE PERFORMANCE," which is a continuation of, and claims a benefit of priority from U.S. patent application Ser. No. 13/267,758, filed Oct. 6, 2011, entitled "SYSTEM, METHOD AND COMPUTER PROGRAM PRODUCT FOR OPTIMIZATION OF TAPE PERFORMANCE." These applications are fully incorporated by reference herein for all purposes.

TECHNICAL FIELD

This disclosure relates to the field of file archiving using tape libraries. More particularly, this disclosure relates to embodiments of optimization of tape performance on tapes written in a serpentine fashion.

BACKGROUND

Businesses, governmental organizations and other entities are increasingly saving large volumes of data necessary for daily operations. This data represents a significant asset for these entities. Consequently, data loss, whether accidental or caused by malicious activity, can be costly in terms of wasted manpower, loss of goodwill from customers, loss of time and potential legal liability. To ensure proper protection of data for business and legal purposes (e.g., to ensure quick recovery of data in the event of a disaster, to comply with document retention requirements, etc.), these entities often back up data to a physical media, such as magnetic tapes or optical disks on a regular basis.

Traditional backup systems placed an application server, backup server, source device, destination device and a local area network ("LAN") in the data path of backup operations. Under these systems, the LANs were becoming overburdened by the amount of data being copied. Often, the backup window (the period in which data is unavailable for normal operations in order to permit backup) was too short to achieve a complete backup of data. Accordingly, many entities implemented Storage Area Networks ("SAN") to relieve the burden of mass data storage and backup from the LAN, freeing the LAN for more immediate data storage and manipulation operations. In SANs data from multiple machines on a network may be backed up to a remote media library. Centralized data backup allows storage problems to be identified at one location and has the advantage of increased efficiency.

One example of a media library commonly used in enterprise backup systems is a magnetic tape library. In a typical magnetic tape library, tapes are contained in cartridges and the tape library contains multiple cartridge slots in which tape cartridges can be stored. The tape cartridges are physically moved between cartridge slots and tape drives by a robot. The robot is controlled by access commands received from the host devices on the network. When specific data is required, the host device determines which cartridge slot contains the tape cartridge that holds the desired data. The host device then transmits a move-element command to the robot and the robot moves the tape cartridge.

In a SCSI tape library, for example, devices that are part of the library are typically addressed by target number and logical unit numbers ("LUN"). Thus, each drive and robot of a tape library typically has a target number and LUN. Cartridge slots, on the other hand, are addressed by element numbers that are used by the robot to locate the slots. Because the robot also places tape cartridges in the drives, each drive is also associated with an element number. If multiple tape libraries are connected to a single device (e.g., a fibre channel to SCSI router, etc.), the tape libraries may be further addressed by bus number.

In current tape library systems, each tape library may present itself as an independent entity on the network. Each host in these systems maintains a view (i.e., a table of target numbers, LUNs and element numbers) of each of the tape libraries. Using this address information a host can format commands to the tape library to perform read/write, backup and other operations. In order to coordinate activities, hosts must cooperate with each other in issuing these commands.

Enabling cooperation, however, requires some form of application to arbitrate between the various hosts or applications that are accessing the tape library. Thus, it may be necessary to employ some form of application (such as a backup application, like Symantec Netbackup) to read and write tapes in a tape library. Additionally, many of these issues may only be dealt with in software if the hosts use the same application or at least compatible applications. For example, if two hosts use the same backup application to store their data to tape, the application can coordinate the access requests of the two hosts so that both are backed up to the tape library. If, on the other hand, the two hosts use different backup applications, the applications will most likely not be able to coordinate their actions to ensure that both of the hosts are properly backed up, since they were probably independently designed and are consequently incompatible. Thus, to prevent conflicts between hosts, each host must typically use the same application to access a shared tape library. This can be inefficient as individual tape libraries cannot store data from multiple applications. Moreover, the files written on a tape by a backup application are written in a format proprietary to that backup application. Thus, to restore or otherwise access files on those tapes, the same backup application is required.

Recently, however, the Ultrium Linear Tape Open (LTO)-5 specification for tapes (hereby incorporated by reference in its entirety for all purposes) has included support for partitioning. The Linear or Long Term File System (LTFS) Format Specification by IBM and Ultrium (also hereby fully incorporated by reference in its entirety for all purposes) makes use of this partitioning support to define a tape format. The LTFS tape format defines a file system for LTO-5 tapes using an eXtensible Markup Language (XML) schema architecture and was utilized in conjunction with the IBM LTO Gen5 Drive. This file system support allows the use of an LTFS-formatted tape as if it were a file system. Files and directories may appear in a directory listing, files may be dragged and dropped from tape, data may be accessed at the file level, etc. With LTFS, tape media can be used like other storage media (e.g., flash drive, hard disk drives, etc.).

Consequently, while it previously was necessary to make use of a backup application to write and read tapes, the introduction of LTFS has simplified the storing and retrieval of files on tape by reducing such operations to a copy. Furthermore, any operating system that includes LTFS support can mount an LTFS formatted tape and read and write the files thereon.

Although LTFS makes the use of a single tape much simpler, it does, however, have limitations. As defined in the current specification, the LTFS file system may be limited to a single tape. If it is desired to use multiple LTFS tapes, these tapes are mounted one at a time or additional support is provided. While the capacity of an LTO-5 tape is relatively high (e.g., around 1500 GB to 3.0 TB or greater) in the realm of business data and backup applications this is a major restriction.

It is thus desired to effectively leverage tape libraries to provide storage in conjunction with a networked based file system and, particularly, to provide a networked based file system utilizing tape libraries that employ LTFS. In view of current limitations of the LTFS specification, there remains room for improvement.

SUMMARY

Embodiments disclosed herein provide a tape performance optimization for use when writing data to tapes in a tape library. In certain embodiments, LTFS may be employed in conjunction with a tape library such that the tapes in the tape library may be formatted using LTFS. Accordingly, operations with respect to the files on the tapes in the tape library may be performed using LTFS. A mapping may be maintained between the files visible through a network based file system presented to host devices and the corresponding location of those files on an LTFS tape in the tape library.

In one embodiment, a tape performance optimization method may include accumulating data in a memory prior to migrating the accumulated data from the memory to a tape in a tape library. In one embodiment, the tape performance optimization method may further include monitoring the accumulation of data, determining whether a certain amount of data has been accumulated in the memory, and causing the accumulated data to be migrated to the tape in the tape library. In one embodiment, the monitoring may include terminating the accumulation of data even if the amount of data has not been accumulated. In one embodiment, the terminating might be triggered by a timeout condition.

In one embodiment, the amount of data being accumulated in the memory may be configured to accommodate to a partition scheme defined in the LTFS specification. In one embodiment, the amount of data being accumulated in the memory is set to be enough to write two wraps or a multiple thereof on a tape. The data being accumulated in the memory may be from one file or multiple files. The memory may reside in a computer physically connected to the tape library. In one embodiment, the computer implements an archive node appliance. In one embodiment, the tape performance optimization methodology is embodied in a tape performance optimization module residing in the archive node appliance.

A computer program product implementing the tape performance optimization method may comprise at least one non-transitory computer readable medium storing instructions translatable by a computer to perform an embodiment of the tape performance optimization method. Embodiments disclosed herein may implement any suitable computer readable medium, including those known in the art (e.g., optical disk, magnetic disk, flash memory, RAM, ROM, EEPROM or other computer readable medium).

A system implementing the optimization method may be implemented in standalone devices, routing devices such as routers, bridges, hubs or other types of network devices. Additionally, embodiments may be implemented as hardware, software programming or some combination thereof. The system may comprise a memory and a tape performance optimization module for accumulating data in the memory, the memory being connected to a tape library having a set of tapes. In one embodiment, the system comprises an archive node appliance.

Embodiments disclosed herein may provide a number of advantages. For example, those skilled in the art can appreciate that the time required to rewind a tape and to position a tape before writing can be significant. Using the optimization disclosed herein, the tape will always be at or near the beginning when it is idle, which is the time when it may be removed. This helps to shorten the time required for the rewind that, in many cases, will automatically occur prior to the tape being unloaded. When re-inserted, the time to reposition to the correct point for continuing the writing of data will be close to minimal as well. Embodiments disclosed herein may therefore advantageously eliminate wasted tape movement time.

These, and other, aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

DETAILED DESCRIPTION

Figure 1:
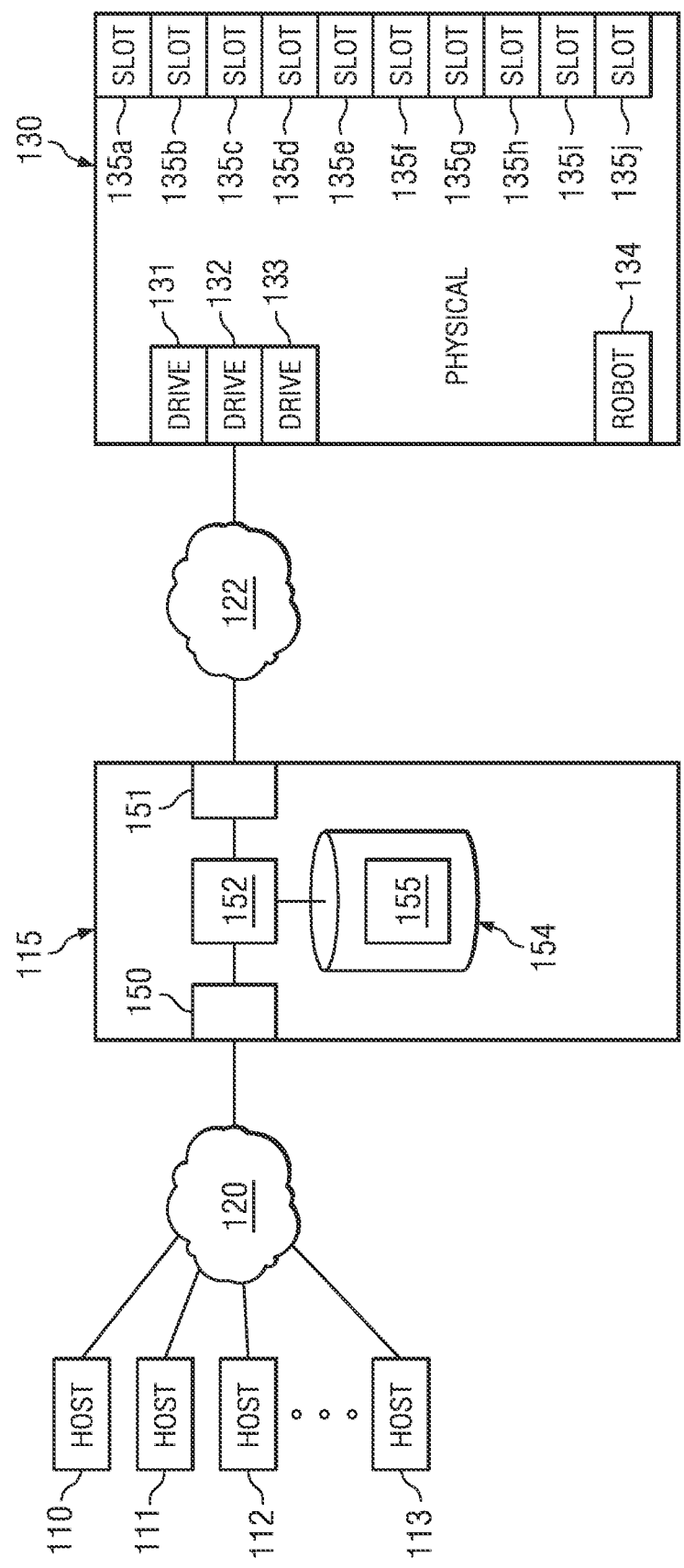
FIG. 1 depicts a diagrammatic representation of one embodiment of a system comprising an Archive Node Appliance.

The invention and the various features and advantageous details thereof are explained more fully with reference to the nonlimiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk drive, flash drive or other memory), hardware circuitry or the like, or any combination.

Before discussing specific embodiments, an example hardware architecture for implementing certain embodiments is described herein. One embodiment can include one or more computers communicatively coupled to a network. As is known to those skilled in the art, the computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (such as a mouse, trackball, stylus, etc.) or the like. In various embodiments, the computer has access to at least one database.

ROM, RAM, and HD are computer memories for storing data and computer-executable instructions executable by the CPU. Within this disclosure, the term "computer-readable medium" is not limited to ROM, RAM, and HD and can include any type of data storage medium that can be read by a processor. In some embodiments, a computer-readable medium may refer to a data cartridge, a data backup magnetic tape, a floppy diskette, a flash memory drive, an optical data storage drive, a CD-ROM, ROM, RAM, HD, or the like.

At least portions of the functionalities or processes described herein can be implemented in suitable computer-executable instructions. The computer-executable instructions may be stored as software code components or modules on one or more non-transitory computer readable media (such as non-volatile memories, volatile memories, DASD arrays, magnetic tapes, floppy diskettes, hard drives, optical storage devices, etc. or any other appropriate computer-readable medium or storage device). In one embodiment, the computer-executable instructions may include lines of compiled C++, Java, HTML, or any other programming or scripting code.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations include, but is not limited to: "for example," "for instance," "e.g.," "in one embodiment."

In many instances it may be desired to provide a file system utilizing media libraries. As an example, FIG. 1 depicts a diagrammatic representation of a system in which a media library is managed to present a network based file system to a plurality of hosts (i.e., host devices). Archive Node Appliance 115 can comprise one or more communications interfaces 150, 151 (e.g., fibre channel interface, Ethernet port or any other type of communication interface known in the art) to connect Archive Node Appliance 115 to network 120 and network 122. In this example, hosts 110, 111, 112 and 113 are coupled to an Archive Node Appliance 115 via network 120. Network 120 can comprise the Internet, a LAN, a WAN, a SAN, a wireless network, or any other communications link, network or protocol known in the art. For example, network may comprise an Ethernet based network employing TCP/IP.

In the example of FIG. 1, Archive Node Appliance 115 is connected to media library 130 via network 122 (Archive Node Appliance 115 and media library 130 may be collectively referred to as an Archive Node or a Networked Attached Tape Archive (NATA)). Network 122 can comprise the Internet, a LAN, a WAN, a SAN, a wireless network, or any other communications link, network or protocol known in the art. For example, network 122 may comprise a fibre channel network (such as a fibre channel SAN) or a SCSI bus, such as a Serial Attached SCSI (SAS) bus. While Archive Node Appliance 115 has been depicted as a standalone device in FIG. 1, it should be understood that Archive Node Appliance 115 can be implemented in a variety of manners and in a variety of architectures. For example, when implemented in a SAN, the Archive Node Appliance may be part of a router, part of a media library or at any other location in a communication path between hosts and a media library.

Media library 130 may comprise a tape library or another media library known in the art such as optical jukeboxes. A tape library, as would be understood by one of ordinary skill in the art, typically consists of one or more tape drives that can read/write data from/to magnetic tape (contained within cartridges also referred to herein as tapes or tape cartridges), eject tape cartridges and perform other operations. A series of slots stores the tape cartridges when they are not in a drive and a robot moves the magnetic tape cartridges between the drives and slots.

As an example, media library 130 can comprise drives 131-133, robot 134 and slots 135 (individually slots 135*a-j*). It should be noted that a media library that employs a single robot or multiple robots in an expandable or modular configuration, but presents itself as a single media library to a network, or any other configuration of one or more media libraries, either physical or virtual, that can present itself as a single media library can be considered a single media library for the purposes of this application. It will also be noted that, although FIG. 1 depicts only a single media library, Archive Node Appliance 115 can be implemented to connect to and utilize multiple media libraries.

Archive Node Appliance 115 comprises a computer processor 152 and a computer readable memory 154 (e.g., RAM, ROM, magnetic disk, optical disk and/or any other computer readable memory known in the art) that can store computer instructions 155 that are executable by processor 152. Computer instructions 155 can be implemented as hardware, software, firmware, some combination or in any other suitable manner as would be understood by those of ordinary skill in the art. In one embodiment, computer instructions 155 can include code implementing a tape performance optimization (TPO) methodology. In one embodiment, the TPO methodology is embodied in a TPO module. In one embodiment, the TPO module resides in an Archive Node Appliance. Example embodiments of the tape performance optimization methodology, module, and Archive Node Appliance are described below.

In operation, computer instructions 155 can be executable such that Archive Node Appliance 115 can present a network based file system (i.e., a file system accessible over a network) to hosts 110, 111, 112, 113, allowing these hosts to organize, store or retrieve files or perform other operations associated with a file system. Operations that can be performed using such network based files systems are understood by those of skill in the art. This network based file system may be for example, a Network File System (NFS) based file system, a Common Internet File System (CIFS) based file system, a File Transfer Protocol (FTP) based file system, a Secure Copy Protocol (SCP) based file system, a Representational State Transfer (REST) based file system, or a file system based on any another type of protocol which allows a file system to be accessed over a network.

Computer instructions 155 may thus be executable to implement operations associated with the presented network based file system in conjunction with media library 130. More specifically, in one embodiment, drives 131, 132, 133 may be LTO-5 compliant drives and tapes in media library 130 may be formatted according to the Linear Tape File System (LTFS) Format Specification, which is incorporated by reference herein. Computer instructions 155 may be executable to store files received through a network based file system on LTFS tapes in media library 130 and maintain mapping information between the files visible through the network based file system and the location of those files in media library 130.

Files visible through a network based file system can be files stored at an intermediate location (e.g., a disk based data store or memory). When a file visible through the network based file system is accessed, computer instructions 155 can be executed to provide access to the file from the intermediate location. File operations can thus occur on the file at the intermediate location rather than directly on the file on the tape.

In some cases, the file may not reside entirely in the intermediate storage when the file is accessed. Therefore, the computer instructions 155 can also be executable to determine the location of the accessed file in the media library 130 using the mapping information, locate and load the correct tape into a drive, and use LTFS to mount the LTFS file system on the tape and access the file to, for example, read the file (as a whole or the remainder of the file) into the intermediate storage.

To increase performance, in some embodiments, it may be desired to store files on computer readable memory 154 when they are initially received, and migrate these files to media library 130 at a later point. Computer instructions 155 may therefore be executable to store files stored by hosts using the network based file system to computer readable memory 154. At some later point, the computer executable instructions 155 may be executable to migrate the file from computer readable memory 154 to media library 130. In this case, computer executable instructions 155 are executable to maintain mapping information between the files visible through the network based file system and the location of those files on computer readable memory 154 or media library 130.

The use of LTFS in conjunction with media library 130 can afford a number of advantages when employed by an Archive Node Appliance 115 to implement a networked based file system. One important advantage is that the file system structure presented through the file system may be substantially mirrored on the tapes of media library 130. Accordingly, if there is a failure of Archive Node Appliance 115 or media library 130, the files on the tapes of media library 130 may be easily located, as they are stored according to a structure that is substantially identical to that defined by the users at the hosts using the network based file system.

Furthermore, the use of LTFS means that tapes on which files of the network based file system are stored may be mounted and the file system on these tapes accessed, using any computing device which supports LTFS. As LTFS is commonly provided in many of today's operating systems, these tapes (and files stored thereon) may be easily accessed, allowing files to be restored or otherwise manipulated without requiring specialized software.

Figure 2:
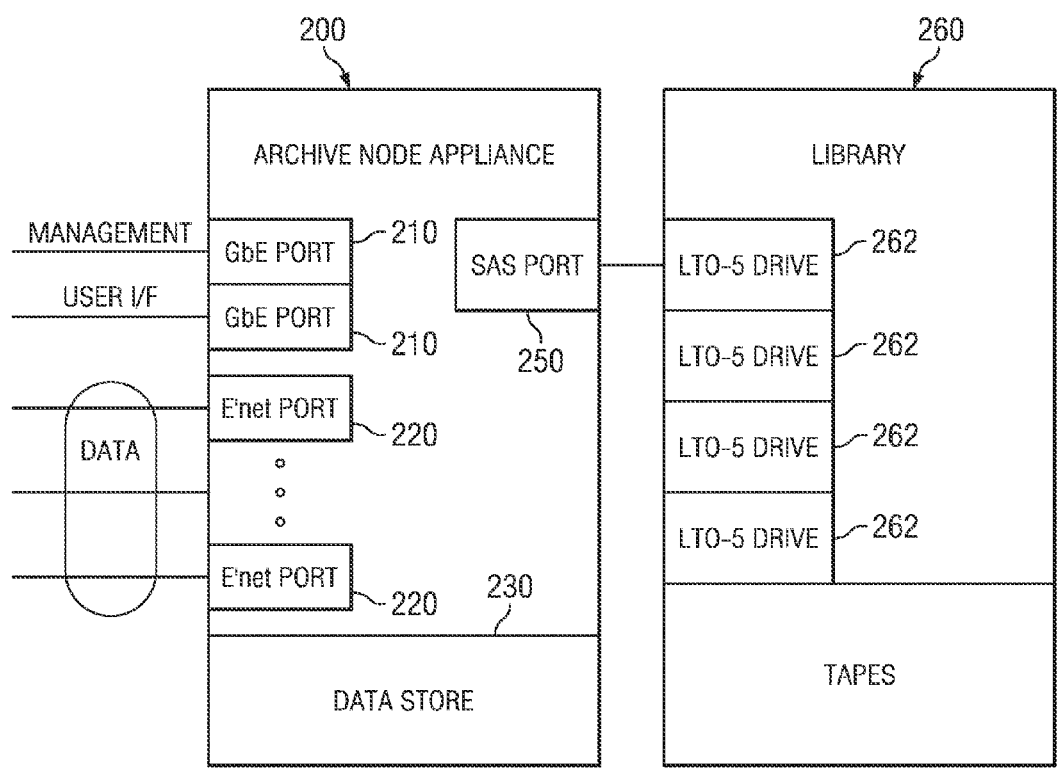
FIG. 2 depicts a diagrammatic representation of one embodiment of an Archive Node Appliance.

It may be helpful here to illustrate architectures for certain embodiments of an Archive Node. FIG. 2 depicts one embodiment of an architecture for an Archive Node that may be used in instances where relatively lower capacity is desired. Here, Archive Node Appliance 200 may comprise one or more Gigabit Ethernet ports 210. These Gigabit Ethernet ports 210 may be dedicated to providing a user interface or for a systems management interface such as the Intelligent Management Platform Interface (IPMI). Archive Node Appliance 200 may also comprise one or more Ethernet ports 220 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types.

In operation, these Ethernet ports 220 may be coupled to hosts, such that a network based file system may be provided by Archive Node Appliance 200 and hosts may interface with Archive Node Appliance 200 using these Ethernet ports 220 to utilize the network based file system, for example, by storing or retrieving files using the network based file system. Accordingly, in one embodiment, Archive Node Appliance 200 represents an interface device between one or more networks (and hosts thereon) and media library 260. Media library 260 may include LTO-5 compliant drives and tapes in media library 260 may be formatted according to the LTFS Format Specification. The network based file system may be implemented using a file system implemented in association with user space such as the Filesystem in Userspace (FUSE) file system; using a kernel-based file system such as Ext2, Ext3, Ext4 Next3, etc.; or almost any other type of file system desired.

In the example of FIG. 2, Archive Node Appliance 200 also includes a data store 230. Data store 230 may be a computer readable memory used to store computer executable instructions, files stored using the network based file system or other data utilized by Archive Node Appliance 200, as will be elaborated on in more detail subsequently. To ensure some degree of redundancy or fault tolerance, data store 230 may be implemented as Redundant Array of Independent Disks (RAID) storage having around 5 TB-8 TB of available storage. Archive Node Appliance 200 also comprises a SAS port 250 through which Archive Node Appliance 200 is coupled to media library 260 via a SAS bus. Media library 260 may be an IBM TS3100 tape library having one or more LTO-5 compliant drives 262 and capable of holding 24 tape cartridges or an IBM TS3200 tape library having one or more LTO-5 compliant drives 262 capable of holding 48 tape cartridges.

While it should be noted that Archive Node Appliance 200 may be implemented substantially in any form factor desired, in one embodiment Archive Node Appliance may be based on a rack-mount storage format and may, for example, be contained in a chassis of a 1U, 2U or 3U form factor with the data store residing internally to the chassis.

Figure 3:
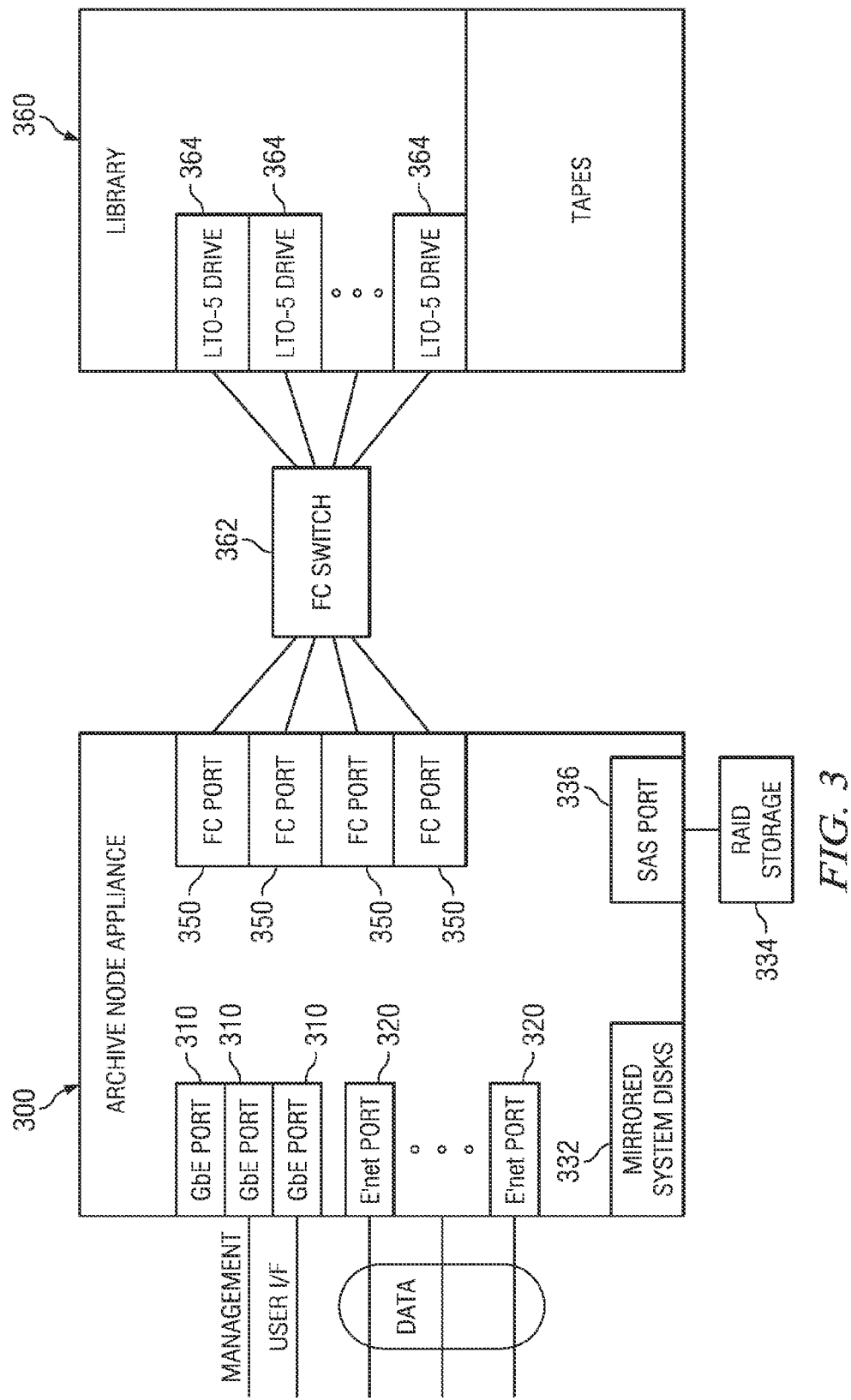
FIG. 3 depicts a diagrammatic representation of one embodiment of an Archive Node Appliance.

Moving on, FIG. 3 depicts one embodiment of an architecture for an Archive Node that may be used in instances where relatively greater storage capacity is required, such as in, for example, large data installations or a cloud storage provider. In this example, Archive Node Appliance 300 may comprise one or more Gigabit Ethernet ports 310. These Gigabit Ethernet ports 310 may be dedicated to providing a user interface or for a systems management interface. Archive Node Appliance 300 may also comprise one or more Ethernet ports 320 for data connections. These Ethernet ports may be 10BASE-T, 100BASE-TX, 1000BASE-T, 10GBASE-LR, 10GBASE-LW, 10GBASE-LRM, 10GBASE-ZR, 10GBASE-LX4, 10BASE-CX4, etc. or may be of a mixture of types.

In operation, these Ethernet ports 320 may be coupled to hosts, such that a network based file system may be provided by Archive Node Appliance 300 and hosts may interface with Archive Node Appliance 300 using these Ethernet ports 320 to utilize the network based file system, for example, by storing or retrieving files using the network based file system and/or by storing or retrieving files using the network based file system. As noted above, the network based file system may be implemented using a file system implemented in association with user space such as the Filesystem in Userspace (FUSE) file system; using a kernel-based file system such as Ext2, Ext3, Ext4 Next3, etc.; or almost any other type of file system desired.

In the example of FIG. 3, Archive Node Appliance 300 also includes a data store 334. Data store 334 may be a computer readable memory used to store computer executable instructions, files stored using the network based file system or other data utilized by Archive Node Appliance 300. To ensure redundancy or fault tolerance, data store may comprise a mirrored system disk 332 comprising the computer executable instruction and other data utilized by Archive Node Appliance 300 during operation and Redundant Array of Independent Disks (RAID) storage 334 coupled to Archive Node Appliance 300 through SAS port 336. The RAID storage may be used to store files associated with the network based file system and may have around 9 TB-150 TB of available storage. Archive Node Appliance 300 also comprises fibre channel ports 350 through which Archive Node Appliance 300 is coupled to media library 360 via a fibre channel switch 362. These fibre channel ports 350 may be, for example, 16, 8, 4 or 2 GB fibre channel ports. Media library 360 may include LTO-5 compliant drives and tapes in media library 360 may be formatted according to the LTFS Format Specification. For example, media library 360 may be an IBM TS3500 tape library having one or more LTO-5 compliant drives 364 and capable of holding around 20,000 tapes.

Again, while it should be noted that Archive Node Appliance 300 may be implemented in substantially any form factor desired, in one embodiment Archive Node Appliance 300 may be based on a rack-mount storage format and may for example, be contained in a chassis of a 1U, 2U or 3U form factor with the data store residing internally to the chassis or portions of the data store, such as the RAID storage residing external to the chassis.

Figure 4:
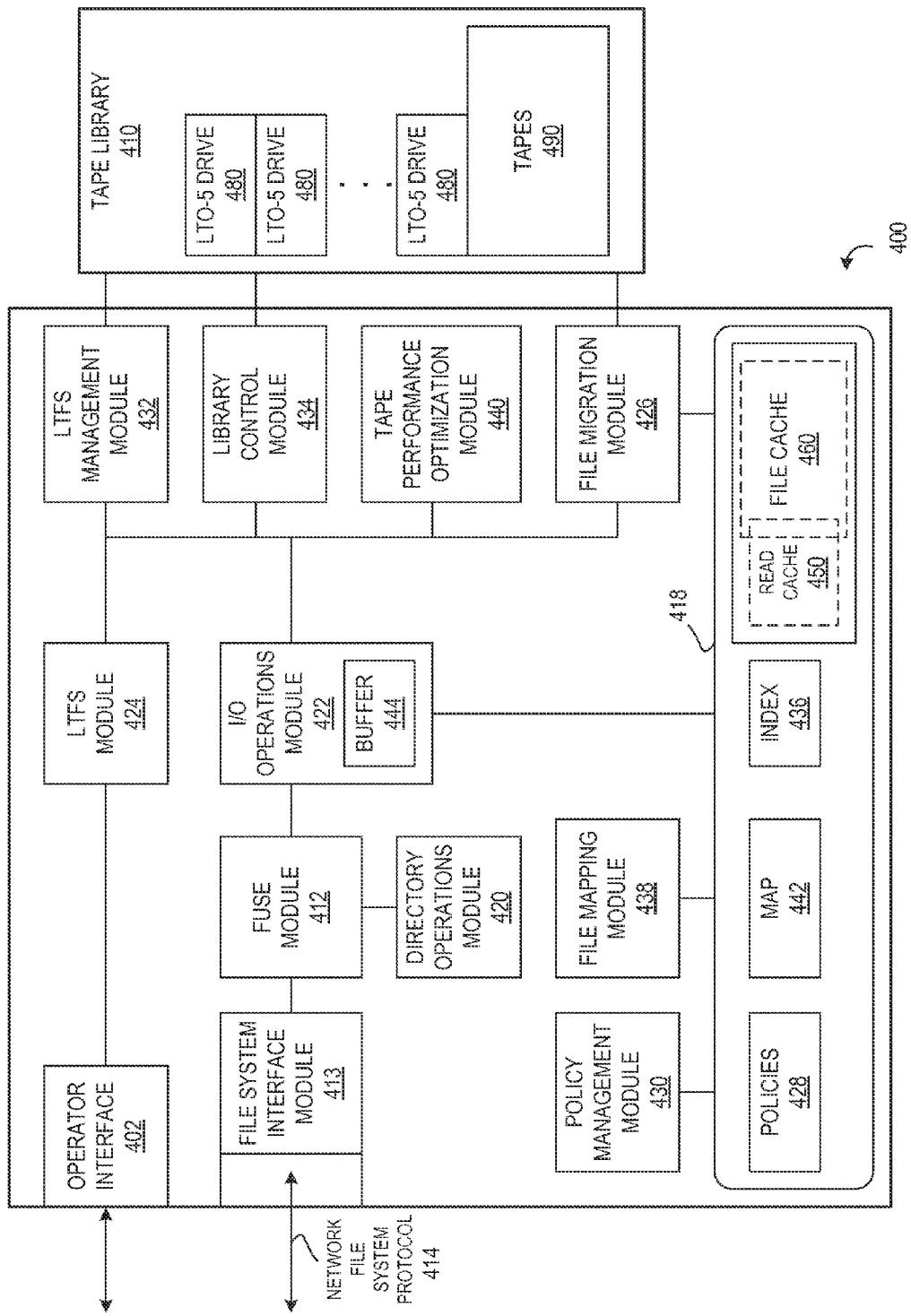
FIG. 4 depicts a diagrammatic representation of one embodiment of a system comprising an Archive Node Appliance connected to one embodiment of a tape library.

Turning now to FIG. 4, one embodiment of a functional architecture for an Archive Node is depicted. Archive Node Appliance 400 may provide an operator interface 402 through which Archive Node Appliance 400 may be configured. Such an operator interface 402 may be provided, for example, using a network based interface such as a set of web pages or the like. In the example of FIG. 4, Archive Node Appliance 400 is connected to tape library 410, which comprises a set of LTO-5 compliant drives 480 and tapes 490, some of which may be LTFS formatted tapes. In one embodiment, each tape in tape library 410 may be used to store data that is compressed, data that is encrypted, data that is both compressed and encrypted or data that is neither compressed nor encrypted. A tape in tape library 410 may initially not be formatted with LTFS until it is needed—at which time it will be formatted according to the policies of the file(s) to be written on the tape, either compressed or uncompressed.

Archive Node Appliance 400 comprises Filesystem in Userspace (FUSE) module 412 that may present a single file system (or 'volume' in one implementation) to a local operating system. That file system can then be presented to host device(s) on the network via network file system interface module 413. Network file system interface module 413 provides access to all or a portion of the FUSE file system as one or more shared volumes (e.g., as a hierarchical file system with directories, etc.) that can be accessed using an interface that operates according to network file system protocol 414 such as NFS, CIFS, FTP, REST, etc. Example interfaces include NFS, CIFS, FTP, REST interfaces. Other means of presenting the one (or more) file systems/volumes to the network may also be implemented. Data associated with the one or more shared volumes can be stored on one or more partitions of data store 418 (a computer readable memory), where the structure of the partitions of data store 418 may, or may not, correspond to the structure of the shared volume(s) presented by network file system interface module 413.

Directory operations module 420 is configured to process any directory operations that are received by FUSE module 412. I/O operations module 422 is configured to process any input or output operations involved with the reading or the storing of files associated with the file system presented by FUSE module 412. These operations include, for example, the writing of files to data store 418, the reading of files from data store 418, the deletion of files from data store 418, the reading of files from a tape in tape library 410 or other operations associated with data store 418 or tape library 410.

These I/O operations may involve the use of LTFS module 424, LTFS management module 432, library control module 434, and index 436. The location of each tape within tape library 410 may be maintained in index 436 (e.g., in which slot or drive each tape is located, in which library the tape is located if multiple tape libraries are in use, etc.). Additionally, in one embodiment, information on what type of data (encrypted, compressed, unencrypted, uncompressed, etc.) is stored on each tape may also be maintained in index 436.

Library control module 434 is configured to control the movement of tapes in tape library 410, including ejecting the tapes from the drives of tape library 410, and the movement of tapes to and from slots of tape library 410 and in and out of drives of the tape library using the robot. LTFS management module 432 is configured to mount or unmount the LTFS file system on a particular tape in a drive of tape library 410. LTFS module 424 is configured to perform LTFS operations with respect to an LTFS mounted file system.

LTFS module 424, LTFS management module 432, Library control module 434, and index 436 may also be utilized by file migration module 426. File migration module 426 is configured to move files from data store 418 to tape library 410 based on policies 428. File mapping module 438 maintains map 442 which correlates a file visible through the FUSE file system to its corresponding location in tape library 410. Specifically, a mapping between the location (for example the path) and name of the file with respect to the FUSE file system, the name and location of that file in the data store 418 and the name and location of that file on one or more tapes in tape library 410 may be maintained in map 442.

Policies 428 may, or may not be, user configured and may be associated with storage of the files or the migration of files from data store 418 to tapes in tape library 410. Such policies may specify, for example, how long to wait before migrating a file (referred to herein as a migration timeout period), whether the files are to be replicated when migrated (e.g., stored in conjunction with multiple Archive Nodes), how many copies of the file to keep, where multiple copies may be kept on different tapes, whether the file is to be encrypted or compressed, etc. Policies 428 may be defined with respect to the directories presented with respect to FUSE module 412 such that those policies may be defined with respect to all files within that directory. Policy management module 430 allows these policies to be managed (e.g., created, updated, defined, deleted, modified, etc.) by a user or otherwise. Policies can be defined at any level of the directory structure provided by FUSE module 412. Because a directory presented by FUSE module 412 may be presented as a shared volume ("a share") by network file system interface module 413, a policy that applies to the directory may also apply to the share.

In operation then, Archive Node Appliance 400 may present a network based file system accessible through an interface, where the files associated with the network based file system may be stored on tape library 410 according to a file system structure that substantially mirrors the file system structure of the presented network based file system. In one embodiment, mirroring the file system structure of the presented network based file system means that at least a portion of the path of the location of the file as it is stored on tape library 410 may be substantially similar to the path of the location of the file as it is presented through the file system.

More specifically, users at host devices coupled to the Archive Node Appliance 400 may perform directory operations and store or read files using an interface for the network based file system provided by the Archive Node Appliance 400. In accordance with these user initiated operations, commands in the network file system protocol 414 employed by the interface may be received at the Archive Node Appliance 400 and implemented by FUSE module 412 with respect to the partitions of data store 418. If the command is associated with a directory operation it may be processed by directory operations module 420. If the command is for the storing of a file, the I/O operations module 422 may write this file to a location in the data store 418. Map 442 may be updated to comprise a mapping between the location and name of the file with respect to the FUSE file system and the name and location of that file in the data store 418.

In one embodiment, the file is stored in data store 418 according to the one or more policies that apply to that file. For example, if a policy that applies to the file specifies that the file should be compressed the file may be compressed before the file is stored in the data store 418. Similarly, if an applicable policy specifies that the file is to be encrypted the file may be encrypted before it is stored in data store 418. In certain embodiments, a self-encrypting disk, full disk encryption or a RAID controller which performs encryption may be utilized in conjunction with data store 418, such that all files stored in data store 418 may be encrypted by the disk or controller when the file is stored to data store 418. In such cases, all files stored to data store 418 may be encrypted when stored to data store 418 and decrypted when read from data store 418.

Based on one or more of the policies 428, at some later point a file may be migrated to tape library 410. As policies 428 may be defined based on a location associated with the presented file system, policies associated with the location (e.g., directory, share, etc.) where the file is stored may be determined from policies 428 and the determined policies applied to migrate the file.

As the file may be received over a network, errors may occur during the transmission of the file or the storage of the file to the data store. To account for network errors or the like, in one embodiment, a time period referred to as a migration timeout period can be utilized. More specifically, when a file is first stored to the data store an amount of time equal to the migration timeout period may be allowed to elapse before the file is migrated. As discussed above, such a migration timeout period may be implemented as a policy. Thus, for example, a policy defining such a migration timeout period may be associated with a share or directory as visible through the network based file system implemented by the Archive Node Appliance.

In certain embodiments, in conjunction or independent of the migration timeout period, an optimization method may be implemented to increase tape performance and eliminate wasted tape movement time. More specifically, in one embodiment, a tape performance optimization method may cause data from one or more files to be accumulated in a memory until there is a sufficient amount of data to be written on two wraps or a multiple of two wraps on a tape. The tape performance optimization method may be implemented to override a certain policy or condition. For example, in one embodiment, if a sufficient amount of data has not been accumulated in the memory, the file may not be migrated right away even if the migration timeout period has elapsed. The amount of data to be accumulated in the memory prior to data migration to a tape in a tape library may be specified in a policy. For example, a policy specifying an amount of data to be written on two wraps or a multiple of two wraps on a tape may be defined using policy management module 430 through operator interface 402 of Archive Node Appliance 400.

As will be described below, the tape performance optimization method may additionally be implemented to correct, accommodate, or otherwise be responsive to one or more conditions to enable robust, fast, and reliable tape performance. For example, in one embodiment, the tape performance optimization method may be implemented to terminate the accumulation of data, even if a desired amount of data has not been accumulated, in order to avoid potential data loss due to prolonged waiting on the accumulation.

In any event, once a file is selected for migration, one or more policies 428 associated with that file may be utilized to migrate the file accordingly (e.g., encrypted, compressed, neither encrypted nor compressed, whether multiple copies of the file are to be maintained, if the file is to be replicated, etc.).

An appropriate tape on which to store the file may be determined and located using index 436. If the appropriate tape is not currently in a drive of the tape library, library control module 434 may be utilized to load the appropriate tape into a drive of tape library 410. More specifically, in most cases when an LTFS tape is formatted it is specified whether the data on that tape is to be compressed or not. Thus, the selection of an appropriate tape may include selecting a tape that is formatted according to a policy specified for the file being migrated (e.g., a tape formatted to hold compressed data may be selected if a policy specifies the file is to be compressed, etc.), selecting a tape that has a location associated with a location where the file is to be stored (e.g., a directory in the path of the location where the file is to be stored, etc.), etc. The selection of an appropriate tape may also involve other considerations not expressly enumerated.

The file system on the appropriate tape may be mounted using LTFS management module 432. File migration module 426 may use LTFS module 424 to copy the file from data store 418 to the appropriate tape at a location on the tape which corresponds to the location of the file as presented through the file system to the host devices coupled to the Archive Node Appliance. After the file is copied to the tape, all, or a portion of, the file may be deleted off of the data store. Accordingly, the migration may entail the creation of one or more directories on the mounted LTFS file system on the tape, where these directories may mirror the directories in the path where the file is stored that are visible to a user at a host device using the network based file system presented by Archive Node Appliance 400. Additionally, when the file is copied to the mounted LTFS file system on the appropriate tape, actions may be taken to implement policies applicable to the file.

For example, if a policy that applies to the file specifies that the file should be compressed, the media drive can be instructed to compress the file. In one embodiment, the use of LTFS may simplify this compression. Specifically, if a file is to be compressed the selection of an appropriate tape formatted to store compressed data may indicate to LTFS module 424 that data to be stored on the tape is to be compressed. LTFS module 424 may configure the drive holding that tape to compress data such that when the file is stored to the tape using LTFS module 424 it is compressed as it is stored.

Similarly, if an applicable policy specifies that the file is to be encrypted, the drive can be instructed to encrypt the file. Encryption of the file being stored may be accomplished by the tape drive in which the appropriate tape is located. Specifically, before mounting the LTFS file system on the appropriate tape one or more commands (for example, SCSI or other types of commands that may or may not include key information to be utilized) may be sent to the drive to cause it to use encryption. The LTFS file system can then be mounted on the tape. LTFS can then be used to store the file on the tape while the tape drive handles the encryption of the data transparently to LTFS.

Other embodiments may accomplish compression or encryption of the files in different manners. For example, in one embodiment, to speed the migration of files, Archive Node Appliance may provide hardware support for such encryption or compression. Embodiments of methods and systems for such encryption or compression are discussed in U.S. patent application Ser. No. 12/025,081, entitled "System and Method For Enabling Encryption," by Robert C. Sims, filed on Feb. 4, 2008, which is hereby incorporated by reference for all purposes.

Additionally, if a policy 428 associated with the file specifies that multiple copies of a file are to be maintained a second tape on which to store the file may be determined and the file migration module 426 may use LTFS module 424 to copy the file from data store 418 to the second tape at a location on the second tape which corresponds to the location of the file as presented through the FUSE file system. Notice here that two separate tapes may have the file stored using an LTFS file system path that mirrors the path of that file as presented through the FUSE file system. Furthermore, if a policy associated with the file specifies that the file is to be replicated the file may also be sent to another Archive Node Appliance.

When a command to read a file is received, map 442 may be consulted to determine the location of the file (e.g., whether it is located in data store 418, on a tape in tape library 410 or both). If the requested file is completely on data store 418, I/O operations module 432 may respond to the read of the file using the file as stored in data store 418. If the file is on a tape (and not entirely in data store 418), the tape on which the file is located may be determined using map 442. Index 436 and library control module 434 can then be utilized to determine if the tape is in a drive, and if not, to load the appropriate tape into a drive of tape library 410. The file system on the tape may be mounted using LTFS management module 432. I/O operations module 422 can then use LTFS module 424 to access the file on the tape and respond to the read of the file.

It will be noted here that certain actions may be taken in association with the read file before the file is used to respond to the read. In particular, in certain embodiments, actions associated with one or more policies applicable to the file may be performed. For example, if a policy that applies to the file specifies that the file should be compressed, the file may be decompressed as the file is read from the tape and before the file is used to respond to the read of the file. In one embodiment, the use of LTFS may simplify this decompression. Specifically, the tape on which the file is stored may be formatted to store compressed data. The presence of this type of tape in the drive may indicate to the LTFS module 424 that data stored on the tape is compressed. The LTFS module 424 may thus configure the drive holding that tape such that when the file is read from the tape using LTFS module 424 it is decompressed.

Similarly, if an applicable policy specifies that the file is to be encrypted the file may be decrypted before the file is used to respond to the read of the file. As LTFS may not support encryption, in one embodiment, decryption of the file being stored may be accomplished by the tape drive in which the appropriate tape is located. Specifically, before mounting the LTFS file system on the tape on which the file is stored one or more commands (for example, SCSI or other types of commands that may or may not include key information to be utilized) may be sent to the drive to cause it to decrypt the file. The LTFS file system can then be mounted on the tape. LTFS can then be used to read the file while the tape drive handles the decryption of the data transparently to LTFS. The file is then used to respond to the read of the file.

In many cases, however, if the file is located on tape, it may take a relatively long amount of time to access the file. This situation may be exacerbated if, for example, the file system on the tape is not currently mounted, the tape itself is not currently in a drive of the tape library, the tape is currently positioned at a location far away from the location where the file is located, etc. These conditions can result in an access time for a file on tape that is on the order of minutes.

Many network based file system protocols have timeout conditions. For example, in the CIFS protocol, an OPEN or a READ command must be responded to within 30 seconds or a timeout condition will occur. The timeout condition may be dependent on the type of network file systems used. In some cases, the timeout period is negotiated between a host and file system. Thus, Archive Node Appliance 400 can be configured to negotiate the timeout time with hosts. The timeout time can be set in a configuration setting for Archive Node Appliance

400. As a result, the time period for responding to such a command may be less than that needed to access the file on the tape. In order to present network based file systems based on these types of protocols such conditions may need to be addressed.

To that end, in some embodiments, read cache 450 may be maintained on data store 418. Read cache 450 may comprise a first portion of each file stored in data store 418 using a network based file system presented by Archive Node Appliance 400. When a file is read, then, if any portion of the file is to be read from a tape, the first portion of the read file that is stored in read cache 450 may be used to respond to the read, while substantially simultaneously accessing the file on the tape. Since the first portion of this file is stored in read cache 450 on data store 418, it can be accessed quickly enough that a timeout on commands can be avoided while the file on the tape is accessed. The remainder of the file can then be read from the tape and used to respond to the commands. The size of the first portion of each file may be user-configurable, based on system parameters, or defined in some other manner.

It will be noted that read cache 450 may comprise first portions of none, all, or some subset of, the files that are stored in conjunction with the network based file system. For example, if data store 418 is corrupted or otherwise unusable, when data store 418 is replaced, read cache 450 may not comprise any first portions of the files. Read cache 450 may then be repopulated as files are accessed by users through the network based file system. During this repopulation then, read cache 450 may comprise first portions of some subset of the files that are stored in conjunction with the network based file system.

Accordingly, in some embodiments, when a file is read if any portion of the file is to be read from tape it can be determined if there is a first portion of that file in read cache 450. If there is, that first portion may be used to respond to the read as detailed above. If, however, there is not a first portion of the read file in read cache 450, the file may be read from tape and used to respond to the read. Additionally, the file data read from tape may be used to repopulate read cache 450 by storing the first portion of the read in read cache 450 at that time.

In one embodiment, as a CIFS command may have a 30 second timeout period and an average or poor timing scenario for a tape access may be on the order of 4 minutes, the first portion of each file stored in read cache 450 may comprise the first 512K of each file. In one embodiment, the read cache size may be based on directories provided by FUSE module 412 so that all the files within the directory are of a particular size. If the directory is presented as a share, the policy thus applies to files within the share. In another embodiment, the size retained on read cache 450 may be dependent upon the size of blocks that may be read in a single operation via the network file system, the set time for a timeout and the time required to load, mount and position a tape with the requested file. It will be noted that the data in read cache 450 may be stored in a manner corresponding to the format in which the file is stored on tape. Thus, for example, if the file is compressed when it is migrated to tape, read cache 450 may comprise the first portion of the file in compressed format, where this first portion equals approximately 512 k of data when uncompressed.

Initially then, when a host device using a CIFS based file system provided by the Archive Node Appliance wishes to read a file, it may send an OPEN command to Archive Node Appliance 400. I/O operations module 422 may determine if the requested file is completely in data store 418 using map 442. If so, I/O operations module 422 may respond to the read of the file using the file in data store 418.

If, however, the file is on a tape, the tape on which the file is located may be determined using map 442. I/O operations module 422 can then initiate the load and access of the file on tape using library control module 434 and LTFS management module 432. I/O operations module 422 delays the response to the initial OPEN command for a time period less than the timeout associated with the received command. In some embodiments, this time period may be the longest time period that does not result in a timeout occurring (e.g., 20 seconds, 29 seconds in the case of CIFS commands, or another time period in the case of commands in other protocols, etc.).

The host device may subsequently send a READ command for a certain amount (e.g., 64K or a different amount) of the file to the Archive Node Appliance 400. I/O operations module 422 can delay the response to this READ command as long as possible without a timeout resulting (e.g., 20 seconds, 29 seconds, in the case of CIFS commands, or another time period below the 30 second timeout in the case of commands in other protocols). After the delay, I/O operations module 422 will respond to the READ command with the data requested. I/O operations module 422 may continue to delay responses to subsequent READ commands and utilize data from read cache 450 to respond to the READ commands until data from the first portion of the file is exhausted or the LTFS file system on the appropriate tape is mounted and the file on the tape can be accessed using LTFS module. I/O operations module 422 may continue to delay responses and dynamically switch between delaying responses and not delaying responses as needed.

In addition to delaying responses, Archive Node Appliance 400 can return less data than requested by the host. For example, Archive Node Appliance 400 may return 1K instead of the requested 64K. Whether Archive Node Appliance 400 returns less data than the amount requested may depend on the network file system protocol, host operating system or other factors. Returning less data than requested provides the advantage that the read cache can be smaller.

I/O operation module 422 may then use LTFS module 424 to access the file on the tape and respond to subsequent READ commands for the file. More specifically, in one embodiment, I/O operations module 422 may utilize LTFS module 424 to access the file on the appropriate tape and read the file from the tape into buffer 444. Subsequent READ commands for the file may be responded to using the data in buffer 444.

Furthermore, in some embodiments, in addition to reading the file into buffer 444, the file may also be read into file cache 460 on data store 418. File cache 460 may be an area on data store 418 utilized for temporary storage of files and may be managed according to almost any cache management technique desired. In certain cases, if a host does not request data of the file at a particular rate (e.g., does not issue READ commands frequently enough, or the READ commands do not request a certain amount of data, etc.), after a certain number of READ commands, I/O operations module 422 may respond to subsequent READ commands for the file using data of the file from file cache 460.

In certain embodiments, the opposite may also occur. More specifically, in some instances the reading of file data to file cache 460 in addition to reading the file into buffer 444 may slow the response to requests for data from a host. In this case, reading the file data into both buffer 444 and file cache 460 may mean that data cannot be delivered at the rate the user is requesting the data or may otherwise slow the response to user requests. Here, the reading of the data of the file into file cache 460 may be stopped before the entire file is in file cache 460 such that requests for the file may be serviced more quickly. Thus, the portion of the file that is in file cache 460 may comprise none, some, or all, of a file.

In one embodiment, the file may be stored in file cache 460 by appending any portions of the file which are read from the tape to a first portion of the file stored in read cache 450, if such a first portion of the read file exists in read cache 450. Thus, if the first portion exists in read cache 450 when any portion of the file not comprised by the first portion in read cache 450 is read from the tape, it may be appended to the first portion already stored in read cache 450. In either case (whether the first portion does, or does not, exist in file cache 460), the entire file may be stored in file cache 460 when the file is read. Thus, at a later point, if portions of the file are deleted from file cache 460, the first portion of the file may be left on data store 418 such that the first portion of the file is stored in read cache 450. Accordingly, read cache 450 will be repopulated with the first portion of that file if the first portion was not in the read cache 450 before the file was read.

Figure 5:
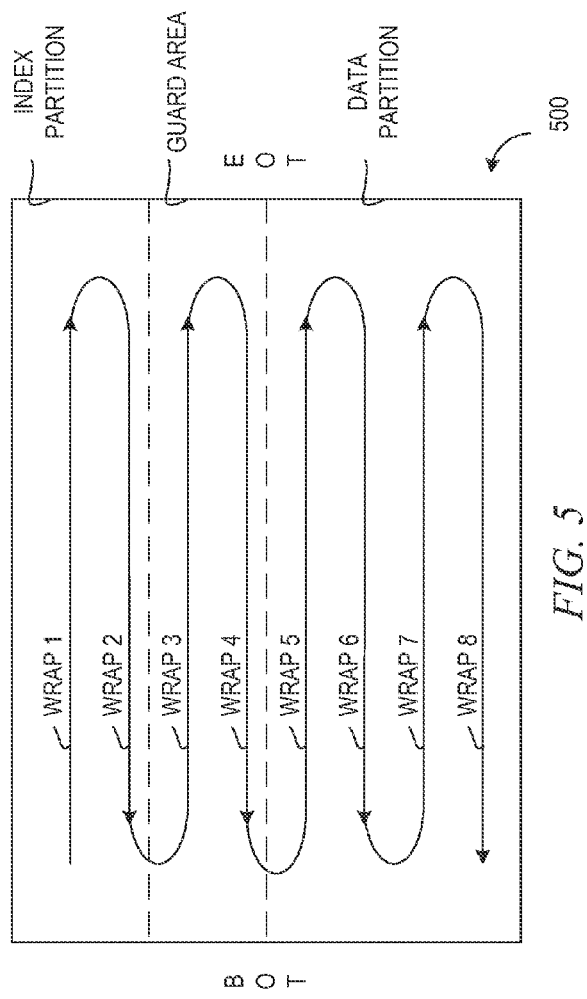
FIG. 5 depicts a diagrammatic representation of a logical view of an LTFS volume.
Figure 6:
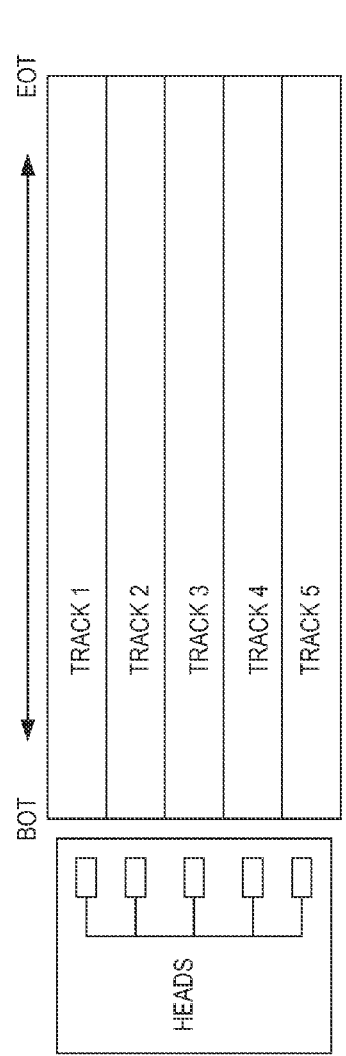
FIG. 6 depicts a diagrammatic representation of a wrap having multiple tracks.

To understand how and why the position of a tape may affect access time and thus tape performance, attention is now directed to FIGS. 5-7. FIG. 5 depicts a diagrammatic representation of a logical view of a LTFS volume on a magnetic tape. LTFS tapes are, today, only LTO-5 tapes. LTO tapes are all written in a serpentine fashion as illustrated in FIG. 5. This means that continuously writing to tape 500 causes tape 500 to pass across the heads (see FIG. 6) from start (BOT) to end (EOT), writing multiple tracks of a wrap (e.g., Wrap 1) in parallel. The heads will then be repositioned to the next set of tracks (e.g., Wrap 2) and the tape will pass across the heads again, this time from the end back to the start. The number of tracks shown in FIG. 6 is meant to be illustrative. The actual number of tracks may vary from implementation to implementation. Likewise, the number of writing circuits (referred to as heads in FIG. 6) may vary from implementation to implementation.

This process continues until all possible head positions have been used. Each pass of the tape (from start to end or from end to start) is known as a wrap. In many cases, when unloading a tape from a tape drive, the tape is automatically rewound to the beginning (also referred to as being "zeroed"). When loading a tape into a tape drive for the purpose of writing data onto it, the tape must be positioned to the correct position before writing can begin.

Figure 7A:
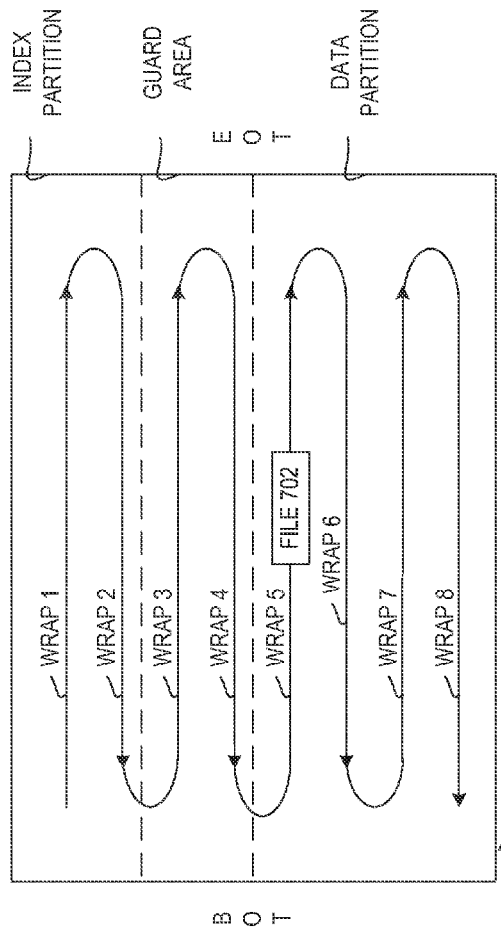
FIGS. 7A-C exemplify how files are added to an LTFS volume.
Figure 7B:
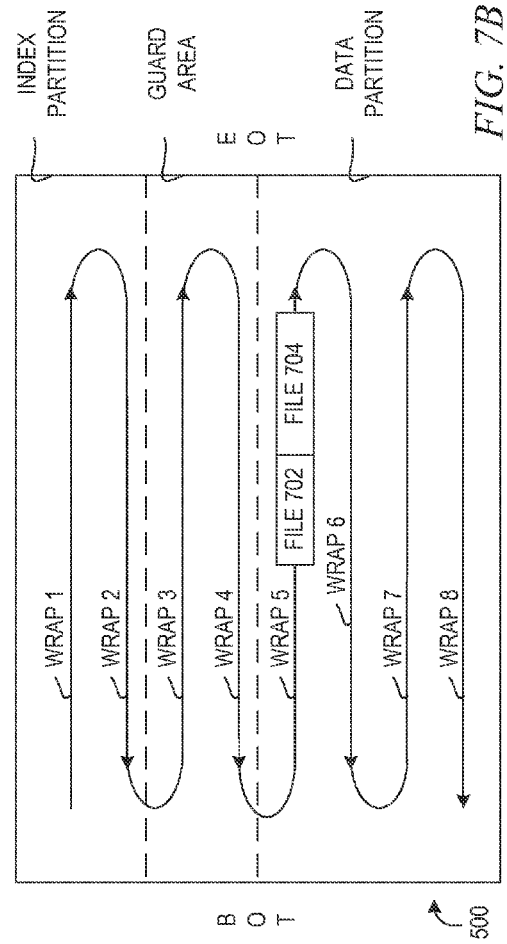
Figure 7C:
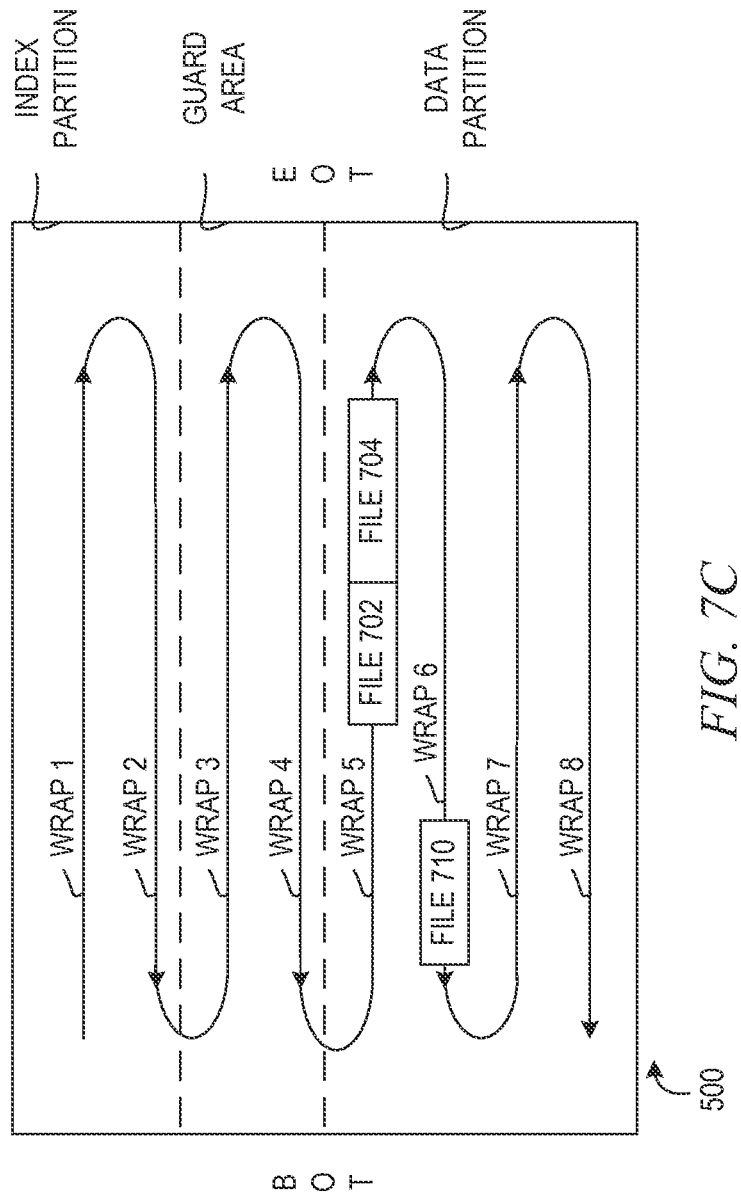

For example, assuming tape 500 is positioned at the beginning, as illustrated in FIGS. 7A-C, to write file 702 (i.e., adding file 702 to tape 500), tape 500 must be repositioned from the beginning (the "zero" point) to the correct position where file 702 is to be written (as indicated by the file system metadata in the index partition). It is possible that adding file 704 occurs immediately after adding file 702 and, as illustrated in FIG. 7B, tape 500 is already positioned properly to add file 704 after file 702 has been added. In that case, no tape movement would be required prior to adding file 704. However, it is also possible that adding file 704 does not occur immediately after adding file 702 and the tape is positioned back at the beginning. In that case, to add file 704, tape 500 must be repositioned to the correct position where file 704 is to be written. Likewise, assuming tape 500 is positioned at the beginning, to add file 710, tape 500 must be repositioned from its current location to the correct position where file 710 is to be written. Such tape movements to position a tape before writing to it can be time consuming, on the order of minutes.

When the writing is done, the tape may be at an arbitrary position that is close to the beginning of a wrap (e.g., file 710), close to the end of a wrap (e.g., file 704), or somewhere in between (e.g., file 702). The further the position is away from the beginning the longer it will take to rewind the tape back to the beginning. Thus, the time required to rewind a tape prior to unloading it can also be significant. Since the tape drive is a scarce resource, every attempt should be made to eliminate wasted tape movement time, thereby reducing access time and increasing tape performance.

As exemplified in FIG. 5, an LTFS volume may be partitioned into two tape areas of arbitrary size separated by a guard area. One tape area is referred to as the index partition and another tape area is referred to as the data partition. The index partition is designed to store file system metadata describing the contents. The data partition is designed to store file data. The guard area is not used and provides a physical separation to ensure that writing to one partition will not interfere with data written to the other partition. These partitions are allocated as multiples of two wraps. Thus, the smallest possible partition size is two wraps. As an example, two wraps may provide approximately 37.5 GB of uncompressed data storage. Currently, an LTO-5 tape has a storage capacity of 1.5 TB. The index partition consists of two wraps (approximately 18.75 GB each) and the data partition has a storage capacity of approximately 1.43 TB.

The "on-tape" index partition can provide fast access to file data stored in the data partition. However, this means that every time a tape is loaded, the LTFS file system has to read the index. Accordingly, when it is time to unload a tape, the tape is rewound to the beginning. Embodiments disclosed herein can save time when unloading a tape.

Figure 8:
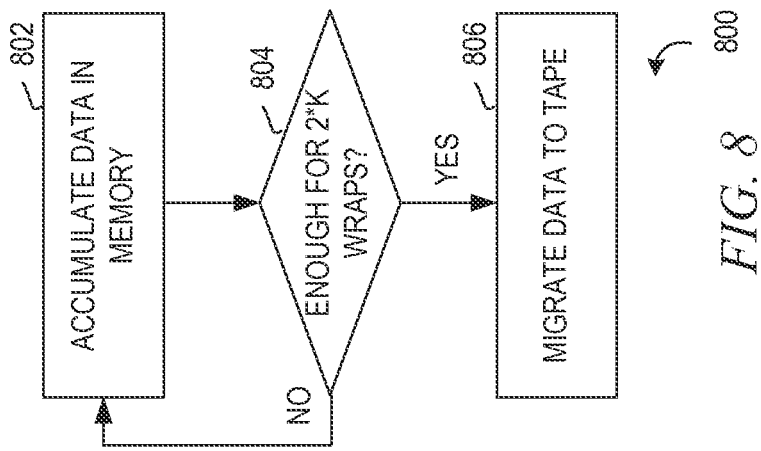
FIG. 8 depicts a flow chart illustrating one embodiment of a method for optimizing tape performance.

Turning now to FIG. 8, which depicts a flow chart illustrating one embodiment of a method for optimizing tape performance. In one embodiment, tape performance optimization method 800 may include accumulating data in a memory (step 802). Suitable memories may include a random access memory, a rotating memory, a buffer, or the like. The memory where data is accumulated according to method 800 may reside in a computer physically connected to the tape library. In one embodiment, the computer implements an archive node appliance. In one embodiment, the tape performance optimization methodology can be embodied in a tape performance optimization module residing in the archive node appliance. In one embodiment, the tape performance optimization module may be responsive to a command to copy one or more files to a mounted LTFS file system on tape. That is, instead of writing the file(s) to tape(s) right away, method 800 can be invoked to ensure that data to be migrated to the tape library is sufficient for two wraps or a multiple of two wraps.

In one embodiment, method 800 may include monitoring the accumulation of data and determining whether a certain amount of data has been accumulated in the memory (step 804). In one embodiment, the amount of data being accumulated in the memory may be configured to accommodate to a partition scheme defined in the LTFS specification. In one embodiment, the amount of data being accumulated in the memory is set to be enough to write two wraps or a multiple thereof on a tape (K≥1 in step 804). In one embodiment, one wrap of tape can store 18.75 GB of uncompressed data. If the data to be accumulated in the memory is compressed, method 800 may operate to calculate, relative to the compression scheme used to compress the data, an appropriate amount of compressed data sufficient to write two wraps of tape or a multiple of two wraps of tape.

In one embodiment, method 800 may include causing the accumulated data to be migrated to the tape in the tape library when the desired amount has been reached (step 806). Since the amount of data thus accumulated is sufficient to write two wraps of tape or a multiple of two wraps of tape, continuously writing the accumulated data to the tape will cause the tape to pass across the heads (see FIG. 6) from start (BOT) to end (EOT), writing multiple tracks in parallel for one wrap, and then be repositioned to the next set of tracks and pass across the heads again from the end all the way back to the start in order to complete the writing for the second wrap.

Using this method the tape will always be at or near the beginning when it is idle—the time when it may be removed. This helps to shorten the time required for the rewind that will automatically occur prior to the tape being unloaded. In one embodiment, using a tape performance optimization method disclosed herein will take zero time or close to zero time to rewind a tape to the beginning (the load point) when unloading occurs. When re-inserted, the time to re-position to the correct point for continuing the writing of data will be close to minimal as well.

Figure 9:
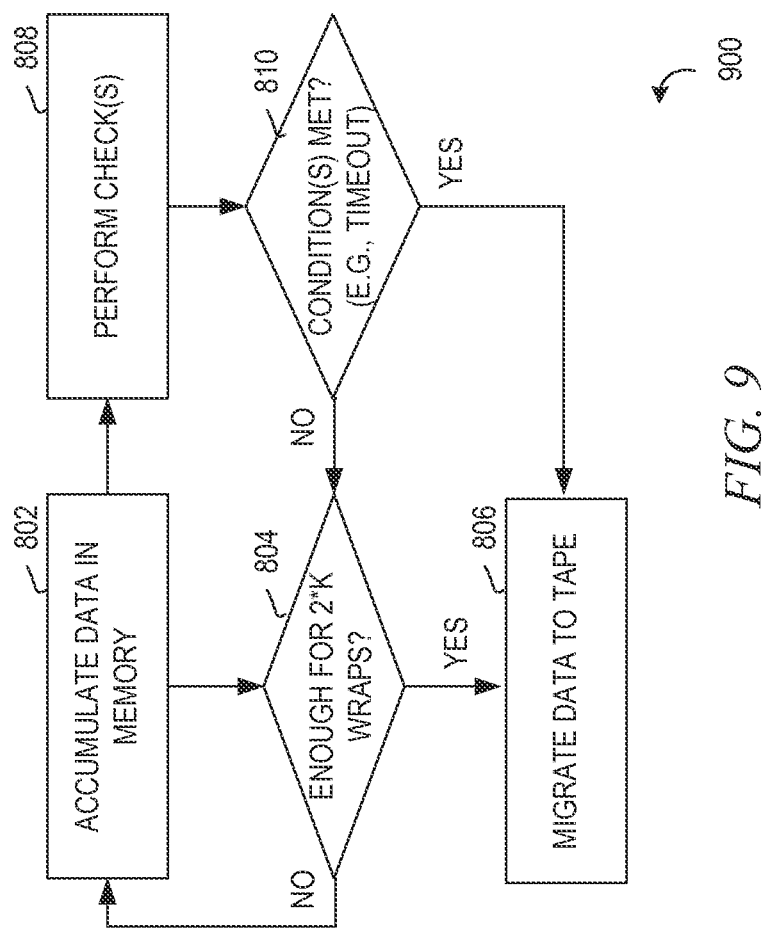
FIG. 9 depicts a flow chart illustrating one embodiment of a method for optimizing tape performance.

Those skilled in the art will appreciate that the above-described tape performance optimization method can be implemented in various ways. FIG. 9 depicts a flow chart illustrating an example of one embodiment of a method for optimizing tape performance. Method 900 may include steps 802, 804, and 806 described above. In addition, method 900 may include performing one or more checks (step 808). For example, one check may involve obtaining the current physical position of a tape and adjusting, if necessary, the amount of data to be accumulated in the memory for the next write. This can be useful if there is any bad spot on the tape. A bad spot on the tape can cause a portion or portions of the tape to be skipped over. When this happens, after writing two wraps (or a multiple thereof) of data on tape, the tape may be positioned at some point past the beginning of tape (BOT).

In one embodiment, method 900 may include using commands to ask the tape drive for its physical position. This physical position can then be used to calculate a new amount of data that can be stored between this position and BOT, which will be something less than two wraps. Method 900 may further include adjusting the amount of data to be accumulated in the memory to reflect the new value, which represents the new amount of data that can be stored between the physical position and BOT and which accounts for the portion(s) of tape that got skipped over during the previous 'two-wrap' write. In this way, next time when the writing (reflective of the new amount of data that can be stored on tape between the physical position and BOT) is complete, the tape is repositioned back to the beginning.

For example, suppose a tape is positioned at BOT and 37.5 GB of data has been accumulated in the memory to write two wraps of tape. Writing 37.5 GB of data should cause the tape to be repositioned at BOT again. However, the tape had bad spots so the tape drive skipped over some portions, causing the tape to be positioned at some point past BOT. In one embodiment, a tape performance optimization module implementing method 900 may send a command or commands to the tape drive, inquiring the current physical position of the tape (where the tape has stopped after 37.5 GB of data has been written to the tape), assuming the tape drive has the ability to report the physical tape position. Those skilled in the art will appreciate that such a command or commands may vary from implementation to implementation and that other ways to obtain the current physical position of the tape may also be possible and anticipated. Suppose the tape drive (or other suitable means) indicates that the tape is currently X feet from BOT, the tape performance optimization module may determine that 32 GB of data can be stored between this position X and BOT. The tape performance optimization module may operate to adjust the amount of data to be accumulated in the memory to 32 GB of data for the next 'two-wrap' write. Or 32 GB+(N*37.5 GB) for a write of multiple of two wraps. In this way, method 900 can be adaptive to the condition of a tape and adjust accordingly the amount of data to be accumulated in a memory prior to next data migration to ensure that the tape is zeroed back to the loading point after writing the accumulated data to tape.

In one embodiment, method 900 may further include determining whether a certain condition(s) has been met (step 810). One example condition may be a timeout condition. As those skilled in the art can appreciate, until the files are on tape they are lacking the protection afforded by having them on tape. Thus, it may be desirable to get the files on tape without waiting an overly long period of time. Accordingly, one embodiment of method 900 may comprise terminating the accumulation of data in the memory when a predetermined timeout condition is met, even if a desired amount of data has not been accumulated. Thus, in one embodiment, a tape performance optimization method can be configured so that it can be overridden in response to a timeout condition.

A computer program product implementing the tape performance optimization method may comprise at least one non-transitory computer readable medium storing instructions translatable by a computer to perform an embodiment of the tape performance optimization method. Embodiments disclosed herein may implement any suitable computer readable medium, including those known in the art (e.g., optical disk, magnetic disk, flash memory, RAM, ROM, EEPROM or other computer readable medium).

A system implementing the optimization method may be implemented in standalone devices, routing devices such as routers, bridges, hubs or other types of network devices. Additionally, embodiments may be implemented as hardware, software programming or some combination thereof. The system may comprise a memory and a tape performance optimization module for accumulating data in the memory, the memory being connected to a tape library having a set of tapes. In one embodiment, the system comprises an archive node appliance.

Returning to FIGS. 8-9, the data being accumulated in the memory may be from one file or multiple files. To migrate a file, one or more tapes on which to store the file may be determined. This determination may be based on policies that have been determined to apply to that file. For example, the number of tapes determined may be based on a policy specifying that the file is to be maintained on multiple tapes. If so, two different tapes on which to store the file may be determined. If a policy to apply to the file specifies that the file is to be encrypted a tape comprising encrypted data may be selected. Similarly, if a policy to apply to the file specifies that the file is to be compressed a tape comprising compressed data may be selected. Assume for purposes of example that the tape on which it is determined to store the file has a TapeID of ANO2394.

Each of the tapes on which it is determined to store the file can then be loaded into a drive, if it is not already in a drive, and the LTFS file system mounted. Specifically, the tape may be located using the index that maintains the location of each of the tapes in the library and loaded into a drive. The file can then be copied from its location on the data store to a location on the tape. In one embodiment, a path that corresponds to the path of the file as visible through the network based file system may be created on the tape using the LTFS file system if it does not already exist. The file can then be saved using the name that corresponds to the name of the file as visible through the network based file system. Continuing with the above example, a path /patient_records may be created on the tape having TapeID ANO2394 if it does not exist and the file may be saved as Patient1.doc on this tape.

In one embodiment, before or during the copying of the file to the mounted LTFS file system on the tape, actions may be taken to implement policies applicable to the file. For example, if a policy specifies that the file is to be replicated it may be sent to another Archive Node Appliance or if a policy that applies to the file specifies that the file should be compressed, the Archive Node Appliance can choose an LTFS tape that is formatted as a compressed tape. Similarly, if an applicable policy specifies that the file is to be encrypted, the Archive Node Appliance can cause the file to be stored on an encrypted tape.

The map can then be updated to associate the tape on which the file is stored, the name and the path of the file as visible through the network based file system, the path and name of the file as stored in the data store and the path and name of the file as stored on the tape. As a specific example, the path /patient records and file name Patient1.doc, as visible through the network based file system can be associated with TapeID ANO2394, a path /data3 and a file name 550e8400-e29b-41d4-a716-446655440000 associated with the file as stored in the data store.

Although the invention has been described with respect to specific embodiments thereof, these embodiments are merely illustrative, and not restrictive of the invention. The description herein of illustrated embodiments of the invention, including the description in the Abstract and Summary, is not intended to be exhaustive or to limit the invention to the precise forms disclosed herein (and in particular, the inclusion of any particular embodiment, feature or function within the Abstract or Summary is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Reference throughout this specification to "one embodiment," "an embodiment," or "a specific embodiment" or similar terminology means that a particular feature, structure, or characteristic described in connection with the embodiment is included in at least one embodiment and may not necessarily be present in all embodiments. Thus, respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Any suitable programming language can be used to implement the routines, methods or programs of embodiments of the invention described herein, including C, C++, Java, assembly language, etc. Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more general purpose digital computers, by using application specific integrated circuits, programmable logic devices, field programmable gate arrays, optical, chemical, biological, quantum or nanoengineered systems, components and mechanisms may be used. In general, the functions of the invention can be achieved by any means as is known in the art. For example, distributed or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code).

A "processor" includes any, hardware system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

It will also be appreciated that one or more of the elements depicted in the drawings/figures can also be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

Furthermore, the term "or" as used herein is generally intended to mean "and/or" unless otherwise indicated. As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

What is claimed is:

1. A method, comprising:
    accumulating data in a memory of an archive node appliance coupled to at least a network and a tape library, the accumulating performed by a tape performance optimization module embodied on a non-transitory computer readable medium including instructions translatable by a processor of the archive node appliance;
    the tape performance optimization module determining whether a predetermined condition is met;
    when the predetermined condition is not met, the tape performance optimization module performing the accumulating until there is a sufficient amount of data to write two wraps of tape or a multiple of two wraps of tape; and
    the tape performance optimization module migrating the data accumulated in the memory of the archive node appliance to a file system mounted on a tape in the tape library.

2. The method according to claim 1, wherein when the predetermined condition is met and regardless of whether a sufficient amount of data to write two wraps of tape or a multiple of two wraps of tape has been accumulated in the memory, the tape performance optimization module terminating accumulation of data in the memory and migrating the data accumulated in the memory of the archive node appliance to the file system mounted on the tape in the tape library.

3. The method according to claim 1, further comprising:
    the tape performance optimization module performing one or more checks relating to the tape in the tape library.

4. The method according to claim 3, wherein the one or more checks comprise checking a current physical position of the tape.

5. The method according to claim 4, further comprising:
    based at least on the current physical position of the tape, the tape performance optimization module adjusting the amount of data to be accumulated in the memory such that the tape is zeroed back to a loading point after migration of the accumulated data from the memory of the archive node appliance to the file system mounted on the tape in the tape library.

6. The method according to claim 1, further comprising:
    based on one or more policies, determining one or more tapes on which to store the data accumulated in the memory of the archive node appliance.

7. The method according to claim 6, wherein the one or more policies comprise at least one of replication, encryption, or compression.

8. A computer program product comprising at least one non-transitory computer readable medium storing instructions translatable by a processor of an archive node appliance to perform:
    accumulating data in a memory of the archive node appliance, the archive node appliance coupled to at least a network and a tape library;
    determining whether a predetermined condition is met;
    when the predetermined condition is not met, performing the accumulating until there is a sufficient amount of data to write two wraps of tape or a multiple of two wraps of tape; and
    migrating the data accumulated in the memory of the archive node appliance to a file system mounted on a tape in the tape library.

9. The computer program product of claim 8, wherein when the predetermined condition is met and regardless of whether a sufficient amount of data to write two wraps of tape or a multiple of two wraps of tape has been accumulated in the memory, terminating accumulation of data in the memory and migrating the data accumulated in the memory of the archive node appliance to the file system mounted on the tape in the tape library.

10. The computer program product of claim 8, wherein the instructions are further translatable by the processor of the archive node appliance to perform one or more checks relating to the tape in the tape library.

11. The computer program product of claim 10, wherein the one or more checks comprise checking a current physical position of the tape.

12. The computer program product of claim 11, wherein the instructions are further translatable by the processor of the archive node appliance to perform:
based at least on the current physical position of the tape, adjusting the amount of data to be accumulated in the memory such that the tape is zeroed back to a loading point after migration of the accumulated data from the memory of the archive node appliance to the file system mounted on the tape in the tape library.

13. The computer program product of claim 8, wherein the instructions are further translatable by the processor of the archive node appliance to perform:
based on one or more policies, determining one or more tapes on which to store the data accumulated in the memory of the archive node appliance.

14. An archive node appliance, comprising:
ports for connecting to at least a network and a tape library;
a memory;
a processor;
a tape performance optimization module embodied on a non-transitory computer readable medium including instructions translatable by the processor to perform:
accumulating data in the memory;
determining whether a predetermined condition is met;
when the predetermined condition is not met,
performing the accumulating until there is a sufficient amount of data to write two wraps of tape or a multiple of two wraps of tape; and
migrating the data accumulated in the memory to a file system mounted on a tape in the tape library.

15. The archive node appliance of claim 14, wherein when the predetermined condition is met and regardless of whether a sufficient amount of data to write two wraps of tape or a multiple of two wraps of tape has been accumulated in the memory, terminating accumulation of data in the memory and migrating the data accumulated in the memory to the file system mounted on the tape in the tape library.

16. The archive node appliance of claim 14, wherein the instructions are further translatable by the processor to perform one or more checks relating to the tape in the tape library.

17. The archive node appliance of claim 16, wherein the one or more checks comprise checking a current physical position of the tape.

18. The archive node appliance of claim 17, wherein the instructions are further translatable by the processor to perform:
based at least on the current physical position of the tape, adjusting the amount of data to be accumulated in the memory such that the tape is zeroed back to a loading point after migration of the accumulated data from the memory to the file system mounted on the tape in the tape library.

19. The archive node appliance of claim 14, wherein the instructions are further translatable by the processor to perform:
based on one or more policies, determining one or more tapes on which to store the data accumulated in the memory.

20. The archive node appliance of claim 19, wherein the one or more policies comprise at least one of replication, encryption, or compression.

* * * * *